United States Patent
Hoyer et al.

(10) Patent No.: US 11,593,917 B2
(45) Date of Patent: Feb. 28, 2023

(54) METHOD FOR CREATING A HIGH-RESOLUTION IMAGE, DATA PROCESSING SYSTEM AND OPTICAL OBSERVATION APPARATUS

(71) Applicant: Carl Zeiss Meditec AG, Jena (DE)

(72) Inventors: Patrick Hoyer, Ulm (DE); Stefan Saur, Aalen (DE); Gerald Panitz, Bopfingen (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 17/106,102

(22) Filed: Nov. 28, 2020

(65) Prior Publication Data

US 2021/0166349 A1 Jun. 3, 2021

(30) Foreign Application Priority Data

Nov. 28, 2019 (DE) .................. 10 2019 132 384.3

(51) Int. Cl.
*G06T 3/40* (2006.01)
*G06T 3/00* (2006.01)
(Continued)

(52) U.S. Cl.
CPC .......... *G06T 3/4053* (2013.01); *G06T 3/0068* (2013.01); *G06T 5/50* (2013.01);
(Continued)

(58) Field of Classification Search
CPC ....... G06T 3/4053; G06T 3/0068; G06T 5/50; G06T 7/0002; G06T 7/337; G06T 2207/20016; G06T 2207/20221
See application file for complete search history.

(56) References Cited

U.S. PATENT DOCUMENTS 7,598,492 B1 * 10/2009 Krzeczowski .......... H01J 37/28
250/306
9,095,255 B2   8/2015 Fanenbruck
(Continued)

FOREIGN PATENT DOCUMENTS

DE    102008051950 A1   7/2010
EP         1838206 B1    4/2018

OTHER PUBLICATIONS

A.S. Fruchter and R.N. Hook, Drizzle "A Method for the Linear Reconstruction of Undersampled Images", Publications of the Astronomical Society of the Pacific, 114:144152, 2002 Feb. 2002 in English.

(Continued)

*Primary Examiner* — Chan S Park
*Assistant Examiner* — Daniel C Chang
(74) *Attorney, Agent, or Firm* — Ewers IP Law PLLC; Falk Ewers

(57) ABSTRACT

A method for creating a high-resolution image of an object from low-resolution images of the object is provided. Both the low-resolution images and the high-resolution image are composed of a pixel grid. An image recording device successively records low-resolution images, in which pitches of the grid points of the pixel grid are increased in one image dimension in comparison with the pitches of the grid points of the pixel grid in the high-resolution image to be created. A data processing system registers the low-resolution images with respect to one another to obtain registered images which are superimposed to obtain the high-resolution image. The grid points of the low-resolution images and the grid points of the high-resolution image have same dimensions and the data processing system uses image information obtained from different positions of the object (Continued)

relative to the grid points in the individual low-resolution images to create the high-resolution images.

24 Claims, 5 Drawing Sheets

(51) Int. Cl.
*G06T 5/50* (2006.01)
*G06T 7/00* (2017.01)
*G06T 7/33* (2017.01)

(52) U.S. Cl.
CPC ............ *G06T 7/0002* (2013.01); *G06T 7/337* (2017.01); *G06T 2207/20016* (2013.01); *G06T 2207/20221* (2013.01)

(56) References Cited

U.S. PATENT DOCUMENTS

| | | | |
|---|---|---|---|
| 9,801,549 B2 | 10/2017 | Panitz et al. | |
| 9,921,406 B2 | 3/2018 | Wang et al. | |
| 2006/0245640 A1 | 11/2006 | Szczuka | |
| 2008/0137363 A1 | 6/2008 | Harris | |
| 2009/0054788 A1 | 2/2009 | Hauger et al. | |
| 2009/0092363 A1* | 4/2009 | Daum | G06T 3/4053 385/116 |
| 2010/0130869 A1 | 5/2010 | Hauger et al. | |
| 2010/0157037 A1 | 6/2010 | Iketani et al. | |
| 2010/0157308 A1 | 6/2010 | Xie | |
| 2011/0043649 A1* | 2/2011 | Nakada | H04N 5/23232 348/E5.024 |
| 2014/0232848 A1* | 8/2014 | Schwedt | G02B 21/008 348/80 |
| 2016/0051131 A1 | 2/2016 | Jeong et al. | |
| 2018/0005361 A1* | 1/2018 | Bulyshev | G06T 3/4053 |
| 2018/0020922 A1 | 1/2018 | Liu et al. | |
| 2018/0256025 A1 | 9/2018 | Yi et al. | |
| 2020/0265211 A1* | 8/2020 | Nasrabadi | G06N 3/04 |

OTHER PUBLICATIONS

Farsiu, Sina; et al.: Advances and challenges in super-resolution. International Journal of Imaging Systems and Technology, 2004, Nr. 2, pp. 47-57 in English.
B. Wronski et al. "Handheld Multi-Frame Super-Resolution" ACM Trans. Graph., vol. 38, No. 4, Article 28, Jul. 2019 in English.
Office Action issued in German Patent Application No. DE 10 2019 132 384.3 (from which this application claims priority), dated Sep. 11, 2020 and English language machine translation thereof.
A. Raabe, et al., Laser Doppler imaging for intraoperative human brain mapping, Nov. 2008.
Vivek J. Srinivasan, et al., Quantitative cerebral blood flow with Coherence Tomography, 2010.
Jiang You, et al., Optical coherence Doppler tomography for quantitative cerebral blood flow imaging, 2014.
M. Goetz, et al., Dynamic in vivo Imaging of Microvasculature and Perfusion by Miniaturized Confocal Laser Microscopy, Jul. 30, 2008.
Martin Oelschlgel, et al., Interoperative Optical imaging of metabolic changes after direct cortical stimulation—a clinical tool for guidance during tumor resection?, Feb. 5, 2018.

* cited by examiner

METHOD FOR CREATING A HIGH-RESOLUTION IMAGE, DATA PROCESSING SYSTEM AND OPTICAL OBSERVATION APPARATUS

CROSS REFERENCE TO RELATED APPLICATIONS

This application claims priority to German patent application DE 10 2019 132 384.3, filed Nov. 28, 2019, the entire content of which is incorporated herein by reference.

TECHNICAL FIELD

The present disclosure relates to a method for creating a high-resolution image of an object from a number of low-resolution images of the object. Additionally, the disclosure relates to a computer program, a non-volatile computer-readable storage medium, a data processing system and an optical observation apparatus, in particular an optical observation apparatus with a scanning imaging method. The optical observation apparatus can be an endoscope, in particular an endomicroscope.

BACKGROUND

In endoscopy and, in particular, in endomicroscopy, the development of scanning imaging methods was promoted by the development of scanning devices based on microelectromechanical systems (MEMS), which facilitate lateral scanning of an object using an optical fiber or with a movable electromechanical mirror (MEMS mirror). A scanning device for an optical fiber based on microelectromechanical systems is described in US 2016/0051131 A1, for example. Scanning imaging methods are used, in particular, within the scope of optical coherence tomography (OCT) or within the scope of confocal imaging, as described in US 2010/0157308 A1 and U.S. Pat. No. 9,921,406 B2, for example.

In the case of scanning imaging methods, the objects are generally scanned first along the line, which is usually referred to as x-direction or x-line. This is followed by a line feed in the y-direction and, subsequently, by a scan along a line in the x-direction again. The smallest possible pitch which the lines can have from one another in the y-direction defines the resolution of the image obtained by the scanning imaging method in this case if all lines are used for the scan. However, an image in which all lines are used for the scan also requires the longest scanning process since many lines have to be scanned. On account of the long scan duration, the frame rate in a video stream based on the scanning imaging method is low. Here, the frame rate specifies the number of frames per second (fps) achievable in the video stream. To be able to achieve higher frame rates, it is necessary to reduce the time duration required to record a frame using the scanning imaging method. As a rule, this is achieved by virtue of not using all lines in a scan for a frame but only, for example, by using every 10th line, as a result of which it is possible to increase the frame rate, albeit to the detriment of the resolution of the frames. By way of example, a scanning endoscope system with an adjustable resolution is described in US 2010/0157037 A1 for an endoscope with a spirally scanning scanner.

In the medical field, scanning imaging methods are used, for example, within the scope of confocal microscopy, in particular within the scope of confocal endomicroscopy, and within the scope of optical coherence tomography. Here, on the one hand, there is the desire for obtaining a resolution that is as high as possible but, on the other hand, there also is the desire for obtaining a fluid video stream, i.e., a video stream with a frame rate of at least 24 fps. As a rule, this cannot be obtained by using all lines when scanning since the scan mechanisms are not able to move the fiber used during scanning, the MEMS mirror used for scanning or any other apparatus used for scanning quickly enough. There is the option of reducing the image section. However, this is only sensible if the observed object is small enough to be able to be observed with the reduced image section. However, if the non-reduced image section is required, the only option for generating a fluid video stream is that of reducing the resolution of the frames by only scanning each n-th line.

SUMMARY

It is therefore an object of the present disclosure to provide a method and an optical observation apparatus which can assist a scanning imaging method in such a way that a high frame rate is achieved and, when necessary, a high-resolution image can be created quickly.

This object is achieved by the methods for creating a high-resolution image as described herein. Moreover, the object is achieved by a computer program, a non-volatile computer-readable storage medium, a data processing system and an optical observation apparatus as also described herein.

According to a first aspect of the disclosure, a computer-implemented method for creating a high-resolution image of an object from a number of low-resolution images of the object is provided. Here, both the low-resolution images and the high-resolution image are each composed of a pixel grid, wherein the pitches of the grid points of the pixel grid of the low-resolution images are increased in at least one image dimension in comparison with the pitches of the grid points of the pixel grid of the high-resolution image. In particular, the low-resolution images in this case can be frames of a video stream, with the video stream consisting of a temporal series of low-resolution frames. Thus, resolution of the image within the scope of the present disclosure does not mean the optical resolution, as arises from the optical properties of the imaging optical elements, but means the pixel resolution which arises from the size of the image-forming pixels and the pitch of these pixels from one another. In the computer-implemented method, the low-resolution images or some thereof are registered with respect to one another in order to obtain a number of registered images. The registered images are then superimposed on one another in order to obtain the high-resolution image. Here, the grid points of the pixel grid of the low-resolution images and the grid points of the pixel grid of the high-resolution image have the same dimensions. Expressed differently, the lower resolution of the low-resolution images does not result from larger grid points in comparison with the high-resolution image but purely from the greater pitch between the grid points in comparison with the pixel grid of the high-resolution image. That is to say, the low resolution is not caused by a distribution of the information over a larger area by increasing the grid points but only by the missing information in the region between the grid points.

In the computer-implemented method according to an aspect of the disclosure, image information obtained from different positions of the object relative to the grid points in the recorded individual low-resolution images is used to create the high-resolution images. Should the observation object exhibit movement, this movement can be used to obtain the image information since the same grid points in the low-resolution images respectively show different points of the object on account of said movement. However, even if the object itself exhibits no movement or insufficient movement, the method according to an aspect of the disclosure can find use if the low-resolution images are each recorded with a slightly displaced grid. If sufficient images are available, the interstices between the individual grid points of a low-resolution image can be complemented by grid points from another image. Such an application is of interest, particularly in the medical field, for example in the field of endomicroscopy with scanning imaging methods. Since living tissue is examined, as a rule, in the medical field, said tissue has pulsations which cause for a sufficient displacement of the object in relation to the grid of the low-resolution images. Then, the grid can remain fixed. Using the method according to an aspect of the disclosure, it is even possible to increase the image resolution above the resolution obtainable when all grid points are used if low-resolution images are present, in which the different positions of the object relative to the grid points lead to corresponding grid points in various low-resolution images respectively representing points of the object whose distance from one another is smaller than the pitch between two adjacent grid points.

The method according to an aspect of the disclosure allows a high-resolution image to be created when necessary from the individual low-resolution images. In the simplest case, supplementing the grid points of a low-resolution image with grid points of the other low-resolution images is all that is required to this end. In so doing, the position which a grid point must adopt in the high-resolution image can be ascertained from the mutual registration of the low-resolution images.

Methods in which the images are registered to one another and subsequently combined in order to increase the resolution are known from, for example, US 2006/0245640 A1, B. Wronski et al. "Handheld Multi-Frame Super-Resolution" ACM Trans. Graph., Vol 38, No. 4, Article 28, July 2019, and A. S. Fruchter and R. N. Hook, Drizzle: "A Method for the Linear Reconstruction of Undersampled Images", Publications of the Astronomical Society of the Pacific, 114: 144-152, 2002 February 2002, but the methods described therein are based on images that have been recorded with a two-dimensional image sensor. Here, undersampling does not result from an increased pitch between pixels, which are small per se, on account of an omission of pixels but, for example, from the fact that the pixels are too large for the resolution of the optical unit employed. The Airy disk obtained by the optical unit is distributed among too many pixels as a result, leading to the resolution actually achievable with the optical unit no longer being reached when an image is recorded. Therefore, the methods described in the cited prior art serve to extract image information from a number of recorded images with the pixels that are too large and to transfer said image information into an image with smaller pixels. By contrast, the dimensions of the grid points of the low-resolution images and the high-resolution image are the same in the present disclosure, just like the optical resolution of the optical components used. Therefore, a transfer of the image information of a grid point to a number of smaller grid points is not required in the present case.

Within the scope of the computer-implemented method according to an aspect of the disclosure, further low-resolution images can be continually added to create the high-resolution image, in addition to the low-resolution images already used to create the high-resolution image. This procedure allows an image to be created quickly, said image having a higher resolution in relation to one of the low-resolution images but not yet having the highest possible resolution. By adding further low-resolution images, the resolution of the resultant image can be continually increased further until a further improvement in the resolution is no longer possible or the resolution is sufficient for the respective application. In particular, there is also the option here of resorting to buffered images when creating the high-resolution image such that, for the purposes of creating a high-resolution image, a sufficient number of low-resolution images for the creation of an image with a higher resolution are available at all times. Should the number of low-resolution images be insufficient to obtain the highest possible resolution, further recorded low-resolution images can be continually added in order to improve the resolution of the high-resolution image.

In particular, the high-resolution image can be created following a trigger event, for example a user input or the detection of a trigger. Here, a number of buffered images are resorted to such that a number of suitable low-resolution images, on the basis of which a high-resolution image can be created, are immediately available when the trigger event is identified. Consequently, it is not necessary to delay the creation of the high-resolution image until a sufficient number of low-resolution images have been recording following the trigger event. If the buffered images do not suffice to obtain the desired resolution following the trigger event, there is the option of using a number of further low-resolution images recorded after the trigger event, in addition to the buffered low-resolution images, in order to create the high-resolution image. Here, the further low-resolution images can be successively worked into the already existing high-resolution image in order to further increase the resolution. Intermediate results can be visualized when using further low-resolution images for creating the high-resolution image. By way of example, the representation of the high-resolution image on a monitor can be updated after a number of low-resolution images have been used for the creation of the high-resolution image. In particular, the representation of the high-resolution image can also be updated after each frame used.

Within the scope of the present disclosure, it is sufficient to start with two low-resolution images for the purposes of creating the high-resolution image and for further low-resolution images to be added until a termination criterion for the addition of further images has been satisfied. By way of example, the termination criterion can be that a specified resolution has been reached, that the resolution has not been significantly improved by the most recently added low-resolution images or that the maximum possible resolution determined by imaging properties of imaging optical elements has been reached. A further termination criterion could be that the object has moved out of the image field between the recording of various low-resolution images. In this case, the low-resolution images cannot be registered.

Missing image information in the low-resolution images can be complemented before or after the registration of the low-resolution images within the scope of the computer-implemented method according to an aspect of the disclosure, wherein the missing image information is obtained on the basis of an interpolation from the available image information. As a result, the high-resolution image can be improved. The registration result can moreover be improved if the interpolation already occurs prior to the registration; this likewise has a positive effect on the high-resolution image.

Additionally, a value for a quality parameter can be ascertained for the high-resolution image within the scope of the computer implemented method according to an aspect of the disclosure. By way of example, the value of the quality parameter can specify the resolution achieved, for example by specifying the dimensions of the smallest structures represented in the high-resolution image. However, it could also contain a relative specification, for example the percentage of the highest possible resolution realized in the current high-resolution image. As a further alternative, the quality parameter can specify the extent to which the resolution in the high-resolution image has been increased by a number of most recently added low-resolution images. Naturally, values for a plurality of such quality parameters can also be ascertained within the scope of the computer-implemented method. In addition to being displayed to the user, such a quality parameter can also be stored for documentation purposes or find use as a termination criterion. In the latter case, for example, a threshold could be set for the value of the parameter, reaching said threshold meaning that the termination criterion is considered to be satisfied and terminating the creation of the high-resolution image from the low-resolution images.

The computer-implemented method according to an aspect of the disclosure can be carried out on a data processing system such as, for example, a commercially available computer. However, there also is the option of using the controller as a data processing system, said controller also controlling the equipment with which the scanning imaging method is carried out. In principle, there is also the option of the data processing system being in a network, to which the recorded low-resolution images are transmitted.

According to a second aspect of the present disclosure, a method for creating a high-resolution image of an object from a number of low-resolution images of the object is provided, wherein both the low-resolution images and the high-resolution image are each composed of a pixel grid. According to the second aspect of the present disclosure, an image recording device is used to successively record a number of low-resolution images of the object, in which the pitches of the grid points of the pixel grid are increased in at least one image dimension in comparison with the pitches of the grid points of the pixel grid in the high-resolution image to be created. In particular, the low-resolution images can be frames of a video stream in this case. A data processing system is then used to register the low-resolution images with respect to one another in order to obtain a number of registered images and to superimpose the registered images in order to obtain the high-resolution image. Within the scope of the method according to the second aspect of the present disclosure, the grid points of the pixel grid of the low-resolution images and the grid points of the pixel grid of the high-resolution image have the same dimensions. The data processing system uses image information it obtains from different positions of the object relative to the grid points in the recorded individual low-resolution images to create the high-resolution images.

Like in the first aspect of the present disclosure, the low resolution of the low-resolution images does not result from the fact that the dimensions of the grid points in the low-resolution images are larger than the dimensions of the grid points in the high-resolution image to be created but results from the fact that the grid points in the low-resolution images have a greater pitch from one another in comparison with the high-resolution image. Increasing the pitches of the grid points from one another in this case facilitates the recording of the low-resolution images with a higher frame rate than would be possible when recording high resolution images. Then, movement of the object relative to a fixed grid and/or movements of the grid relative to the object can be used to create the high-resolution image. On account of these movements, grid points of different low-resolution images corresponding to one another indicate different points on the object. With the aid of the registration information, it is possible to use the grid points of the individual low-resolution images to make an image with a higher resolution.

The pitches of the grid points of the pixel grid when recording the low-resolution images can be increased in comparison with the pitches of the grid points of the pixel grid of the high-resolution image by virtue of the fact that certain lines of the pixel grid are not used when recording the low-resolution images. In the way, there already is a high resolution in one direction of the grid and the resolution of the low-resolution images is only reduced in the other direction. Moreover, this procedure facilitates the use of usual methods for increasing the frame rate. As a rule, only every n-th line is read in such methods in order to increase the frame rate by reducing the number of lines to be read.

Recording the low-resolution images can occur continually in the method according to the second aspect of the present disclosure, with the most recently recorded low-resolution images being buffered. Then, the buffered low-resolution images are used to create the high-resolution image. In this way, a number of low-resolution images, on the basis of which a high-resolution image can be created, are already available at all times.

The high-resolution image can be created following a trigger event. This configuration allows the high-resolution image only to be created when it is required. Here, the trigger event can be an event caused by the user, for example a keyboard entry or a voice command, or an automated trigger event, for example a trigger event caused by the detection of predetermined image content in one of the low-resolution images, or a trigger event caused by the elapse of a certain amount of time.

In the method according to the second aspect of the present disclosure, the object can be scanned by an optical fiber, in particular, for the purposes of recording the low-resolution images. The method according to the second aspect of the disclosure can include, in particular, the computer-implemented method according to the first aspect of the disclosure.

According to a third aspect of the present disclosure, a computer program for creating a high-resolution image from a number of low-resolution images is provided. Here, both the low-resolution images and the high-resolution image are each composed of a pixel grid, wherein the pitches of the grid points of the pixel grid of the low-resolution images are increased in at least one image dimension in comparison with the pitches of the grid points of the pixel grid of the high-resolution images. In particular, the low-resolution images can be frames of a video stream in this case. The computer program according to an aspect of the disclosure comprises instructions which, when executed on a computer, prompt the computer to register the low-resolution images with respect to one another in order to obtain a number of registered images and to superimpose the registered images on one another in order to obtain the high-resolution image. Here, the grid points of the pixel grid of the low-resolution images and the grid points of the pixel grid of the high-resolution image have the same dimensions. Moreover, the computer program according to an aspect of the disclosure comprises instructions which, when executed on a computer, prompt the latter to use image information obtained from different positions of the object relative to the grid points in the individual low-resolution images to create the high-resolution image.

According to a fourth aspect of the present disclosure, a non-volatile computer readable storage medium with instructions stored thereon for creating a high-resolution image from a number of low-resolution images is provided, wherein both the low-resolution images and the high-resolution image are each composed of a pixel grid and the pitches of the grid points of the pixel grid of the low-resolution images are increased in at least one image dimension in comparison with the pitches of the grid points of the pixel grid of the high-resolution image. In particular, the low-resolution images can be frames of a video stream in this case. When the instructions stored on the non-volatile computer-readable storage medium are executed on a computer, they prompt the computer to register the low-resolution images with respect to one another in order to obtain a number of registered images and to superimpose the registered images on one another in order to obtain the high-resolution image. Here, the grid points of the pixel grid of the low-resolution images and the grid points of the pixel grid of the high-resolution image have the same dimensions and the instructions prompt the computer, when executed on the latter, to use image information obtained from different positions of the object relative to the grid points in the individual low-resolution images to create the high-resolution images.

The computer program according to an aspect of the disclosure and the non-volatile computer-readable storage medium according to an aspect of the disclosure allow the computer-implemented method according to an aspect of the disclosure to be carried out by a computer or any other data processing system and hence allow the advantages obtainable in relation to the computer-implemented method according to an aspect of the disclosure to be realized with the aid of a computer or any other data processing system. Therefore, reference is made to the description of the computer-implemented method according to an aspect of the disclosure in respect of the advantages obtainable with the computer program according to an aspect of the disclosure.

According to a fifth aspect of the present disclosure, a data processing system comprising a processor and at least one memory is moreover provided. On the basis of instructions of a computer program for creating a high-resolution image from a number of low-resolution images stored in the memory, the processor is configured to register the low-resolution images with respect to one another in order to obtain a number of registered images and to superimpose the registered images on one another in order to obtain the high-resolution image. Here, both the low-resolution images and the high-resolution image are each composed of a pixel grid and the pitches of the grid points of the pixel grid of the low-resolution images are increased in at least one image dimension in comparison with the pitches of the grid points of the pixel grid of the high-resolution image. In particular, the low-resolution images can be frames of a video stream. The grid points of the pixel grid of the low-resolution images and the grid points of the pixel grid of the high-resolution image in this case have the same dimensions. The instructions moreover prompt the processor on which they are executed to use image information obtained from different positions of the object relative to the grid points in the individual low-resolution images to create the high-resolution image. The data processing system according to an aspect of the disclosure facilitates the execution of the computer program according to an aspect of the disclosure. As a result, the realization of the advantages linked to the computer program, and hence also the realization of advantages linked to the computer-implemented method according to an aspect of the disclosure, is made possible.

In an advantageous configuration of the data processing system according to an aspect of the disclosure, the latter includes a buffer, which could be embodied as a circular buffer, for example, in order to buffer low-resolution images. This renders it possible within the scope of the computer-implemented method for creating a high-resolution image to resort to images that have already been recorded and are located in the buffer. If the buffer is embodied as a circular buffer, buffering a new low-resolution image deletes the oldest low-resolution image located in the circular buffer, and so it is always only the most current low-resolution images that are buffered.

An optical observation apparatus is provided according to a sixth aspect of the present disclosure. It is equipped with an image recording device configured to record images of an object, said images being composed of a pixel grid, and with a data processing system according to an aspect of the disclosure. Using the optical observation apparatus according to an aspect of the disclosure, it is possible to carry out the method according to an aspect of the disclosure to create a high resolution image such that the advantages that have been described in relation to the method according to an aspect of the disclosure for creating a high resolution image of an object can be realized, can be realized by the optical observation apparatus according to an aspect of the disclosure.

The optical observation apparatus according to an aspect of the disclosure can include a device for altering the pitches between the grid points of the pixel grid. By way of example, this device can be a computer that has such a controlling effect on the recording of the low-resolution images that only some of the available grid points are used to create the low-resolution images. It is possible to influence the frame rate of the images recorded by the image recording device by altering the pitches of the grid points. Thus, increasing the pitches of the grid points can obtain an increase in the frame rate, albeit with a reduction in the resolution of the images. By suitably setting the pitches of the grid points from one another, it is possible to set the minimum frame rate required for a fluid video stream in a targeted manner, with the maximum resolution possible with the set frame rate being able to be achieved. What can be achieved by such an adjustment of the frame rate and the resolution is that the high-resolution image can be created with the smallest possible number of low-resolution images.

In particular, the image recording device of the optical observation apparatus can also include a sensor for capturing luminous energy, an optical fiber for receiving light originating from the object, be it fluorescence light emitted by the object or light reflected by the object, and for guiding the received light to the sensor, a scanning device which facilitates a scanning of the object along grid points of a grid for receiving the light which originates from the individual grid points and an image generation device which generates an image of the object with a pixel grid corresponding to the grid when scanning the optical fiber from the luminous energy captured by the sensor for the individual pixels.

Here, the sensor can be subdivided into a plurality of regions which are sensitive to different wavelengths of the light supplied with the fiber such that it is possible to obtain not only brightness information but also color information. Alternatively, it is possible to obtain the color information sequentially by virtue of different spectral filters being successively introduced into the beam path between the fiber and the sensor or between the fiber and the object. The time required to scan a grid point then is at least so long that all spectral filters can be successively introduced between the fiber and the sensor or between the fiber and the object during this time period in order to obtain the required color information in a temporally sequential sequence. In this case, the sensor need not have regions with different color sensitivity. Moreover, should fluorescence light be detected, use can be made of a sensor that is able to measure the fluorescence lifetime of the dye at the scanned grid point used to excite the fluorescence. As a result, information about the chemical composition of the tissue is also obtained by brightness differences in addition to the contrast.

The image recording device with the scanning optical fiber is particularly suitable for the exemplary embodiment of the optical observation apparatus as a confocal microscope, in particular as a confocal endomicroscope, or as an optical observation apparatus for carrying out optical coherence tomography, for instance an endomicroscope for carrying out optical coherence tomography.

If the image recording device includes a scanning optical fiber, the device for altering the pitches between the grid points of the grid can act on the scanning device in order to alter the pitches between the grid points used when scanning. In particular, it can act on the scanning device in such a way that only certain lines of the grid are used when recording an image and other lines of the grid are omitted. By reading a reduced number of lines it is possible to increase the frame rate and, at the same time, achieve the maximum resolution of the image in the direction of the lines. Then, to create the high-resolution image, all that has to be done is to increase the resolution in the other direction.

BRIEF DESCRIPTION OF THE DRAWINGS

The disclosure will now be described with reference to the drawings wherein.

DESCRIPTION OF EXEMPLARY EMBODIMENTS

Figure 1:
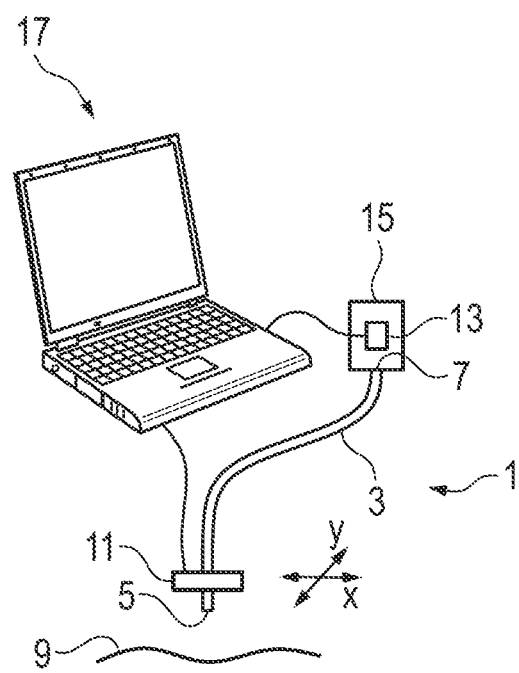
FIG. 1 shows a schematic illustration of an endomicroscope which is configured to carry out a scanning imaging method.

For explanatory purposes, the disclosure will be described in detail below on the basis of exemplary embodiments. Here, FIG. 1 shows an endomicroscope with a scanning device as an exemplary embodiment of an optical observation apparatus with an image recording device embodied to record images of an object, said images being composed of a pixel grid. FIGS. 2 to 8 show very schematic images that have been obtained on the basis of the scan carried out by the endomicroscope.

The endomicroscope 1 shown in FIG. 1 includes an optical fiber 3 with an input end 5 (or first end) and an output end 7 (or second end). The input end 5 is made to face the observation object 9 and it is located in a scanning device 11, with the aid of which the input end 5 can be moved along two lateral directions, referred to as x-direction and y-direction below, with respect to the observation object 9. In particular, the scanning device can be realized with microelectromechanical systems (MEMS). By way of example, a scanning device using microelectromechanical systems is described in US 2016/0051131 A1. Reference is made to this document in respect of the structure of a suitable scanning device.

The second end of the optical fiber 3 faces a sensor 13, with which it is possible to capture luminous energy incident on the sensor 13. The sensor is located in a housing 15, which is embodied as a separate module in the present exemplary embodiment, but which can also be embodied as a handle, and in which, moreover, a light source (not illustrated in the figure) for generating illumination light for illuminating the observation object 9 and an input coupling apparatus for coupling the illumination light into the second end 7 of the optical fiber 3 are also housed. In particular, the light source can be a laser light source. However, the light source can also be arranged outside of the housing 15 and be connected to the latter by way of a light guide. Then, the output end of the light guide is situated in the housing 15. In this case, the input coupling apparatus input couples the illumination light of the optical fiber emerging from the output end of the light guide. The illumination light can be white light, i.e., have a broadband spectrum, or light with a spectrum that consists of one or more narrowband spectral ranges, for example of one or more narrowband spectral ranges suitable for exciting a fluorescence in the observation object 9.

Illumination light coupled into the second end 7 of the optical fiber 3 is guided through the optical fiber 3 to the first end 5, from where the illumination light emerges in the direction of the observation object 9. Illumination light reflected by the observation object 9 or light excited by the illumination light and emitted by the observation object 9, for instance fluorescent light, enters into the first end 5 of the optical fiber 3 in turn and is guided from the latter to the second end 7, from where it emerges in the direction of the sensor 13. Moreover, focusing optical units can be located at, or in front of, the ends 5, 7 of the optical fiber 3 and these can be used to focus light onto the surface of the observation object 9 or onto the sensor 13. In particular, the endomicroscope 1 can be embodied as a confocal endomicroscope. In addition or as an alternative thereto, it can also be embodied as an endomicroscope for carrying out optical coherence tomography (OCT). Confocal microscopy and optical coherence tomography are well-known methods and described in US 2010/0157308 A1 and U.S. Pat. No. 9,921,406 B2, for example. Therefore, the description of details in respect of confocal microscopy and in respect of optical coherence tomography is dispensed with in the scope of the present description. Instead, reference is made to US 2010/0157308 A1 and U.S. Pat. No. 9,921,406 B2.

Recording the image with the aid of the endomicroscope 1 is controlled with the aid of a computer 17 in the present exemplary embodiment. However, the control can also be implemented with a dedicated control device. The computer 17 used for controlling in the present exemplary embodiment is connected both to the scanning device 11 and to the sensor 13. In the present exemplary embodiment, the scanning device 11 is controlled by the computer 17 in such a way that the observation object 9 is scanned along a grid 19 with grid points 21. At each scanned grid point 21, there is an illumination of the observation object 9 with illumination light and a recording of the reflected illumination light or of the light emitted by the observation object 9 on account of an excitation with the illumination light. Then, the computer generates an image from the reflected illumination light recorded at the grid points 21 or from the light emitted by the observation object recorded at the grid points 21, the pixel grid of said image corresponding to the grid 19 used during the scanning. Therefore, the optical fiber 3, the scanning device 11, the sensor 13 and the computer 17 together form an image recording device, in which the computer 17 serves as image generation device.

In the present exemplary embodiment, the grid includes grid lines which extend in the x-direction (see FIG. 2) and grid columns which extend in the y-direction. Here, in the present exemplary embodiment, scanning of the observation object is carried out line-by-line, i.e., in such a way that a line is scanned, i.e., there is a scan along the x-direction, and, after the line has been completed, there is an offset of the optical fiber 3 in the y-direction before a line extending in the x-direction is scanned again using the optical fiber 3, which has been offset the y-direction. During the scanning procedure, the sensor 13 is exposed at each grid point 21, at which the optical fiber is situated at the time of a recording. In this way, an image of the observation object 9, as shown schematically in FIG. 2, is generated line-by-line with the aid of the sensor 13 and the scanning device 11.

Figure 2:
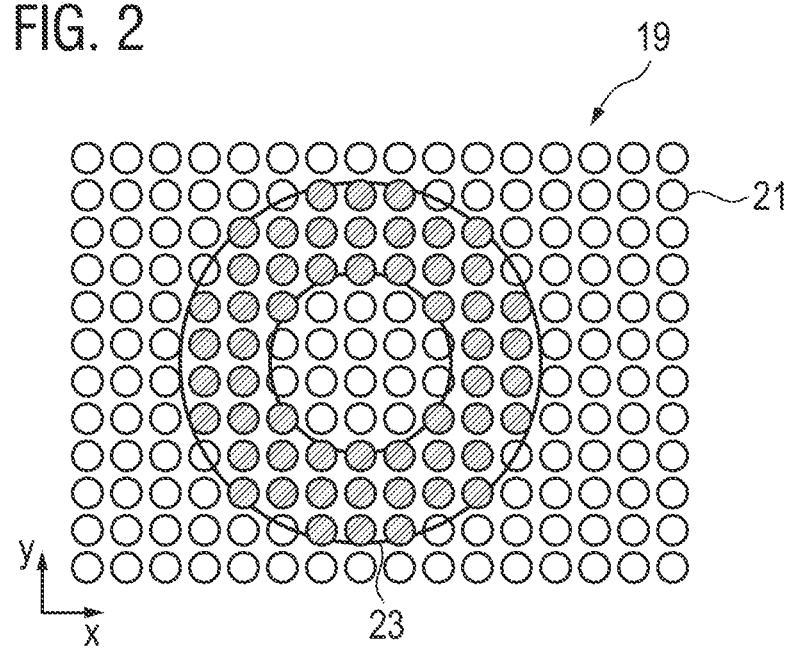
FIG. 2 shows a schematic illustration of a high-resolution image.

FIG. 2 very schematically shows an image in which all grid points 21 of the grid 19 have been used when scanning the observation object 9. Here, FIG. 2 schematically shows a structure 23 of the observation object 9, which is represented as a ring for illustration purposes. Grid points 21 situated over the structure 23 lead to different signal on the sensor 13 than those grid points 21 that are not situated over the structure 23. In FIG. 2 and FIGS. 3 to 8, the signal generated by the grid points 21 situated over the structure 23 is represented by hatched grid points 21. A high resolution of structures 23 of the observation object 9 is possible with small dimensions of the grid points 21 and correspondingly small pitches between the grid points 21, as are facilitated by the use of the optical fiber 3. On account of the large number of grid points to be scanned in connection with the high resolution, the generation of a high-resolution image with the aid of the scanning imaging method requires comparatively much time. Should a video sequence be recording using the scanning imaging method, only low frame rates can therefore be achieved on account of the time duration required for recording a frame with the aid of the scanning imaging method.

To increase the frame rate there is the option of reducing the number of grid points 21 used during the scanning in order to increase the speed with which the scan can be carried out for a frame. To this end, the scanning device 11 can be acted upon in controlling fashion by the computer 17 in the present exemplary embodiment in such a way that certain lines 25 are omitted when scanning along the grid 19. Expressed differently, only every n-th line is scanned during scanning, as illustrated schematically in FIG. 3. The grid points 21 of the lines 27 used during the scanning are represented by full lines in the figure while the grid points 21 of the lines 25 omitted during the scanning are represented by dashed lines. In the shown illustration, only every third line of the grid 19 is used during the scanning, and so the frame rate can be approximately tripled. In reality, more than two lines are omitted between two scanned lines in order to increase the frame rate to at least 24 fps.

The omission of lines 25 during the scanning leads to a reduction in the image resolution in the y-direction. It is evident from FIG. 3 that, on account of the reduced number of lines, fewer grid points 21 are available in the image for representing the structure 23 than when using all lines.

While recording a video stream with a reduced resolution may be sufficient in some cases, for example for as long as there is only navigation to an examination site, there are situations in which a high-resolution image of the structures 23 of the observation object 9 is required. This applies, in particular, if the endomicroscope 1 has reached the examination point and the examination point should be examined in respect of changes. So as not to have to interrupt the recording of the video stream but nevertheless obtain a high-resolution image, the low-resolution frames of the video stream are buffered for a certain amount of time in the present example embodiment, for the purposes of which use can be made, for example, of a circular buffer, i.e., a memory in which data is stored for a certain storage time and, in this case, the data in the memory for which the storage time has elapsed is overwritten with current data. The user of the endomicroscope 1 can then trigger the generation of a high-resolution image by virtue of entering a corresponding command into the computer 17 as a trigger signal. By way of example, the command can be a keyboard entry or, should the computer 17 be equipped to accept voice commands, a voice command. However, it is also possible to use an external input apparatus, which is connected to the computer 17 by wire or radio. By way of example, such an external input apparatus can be a foot switch, following the actuation of which a trigger signal is transmitted to the computer 17. Compared to a keyboard entry, foot switch and voice commands are advantageous in that the user of the endomicroscope 1 requires no hands for generating the trigger signal.

Figure 3:
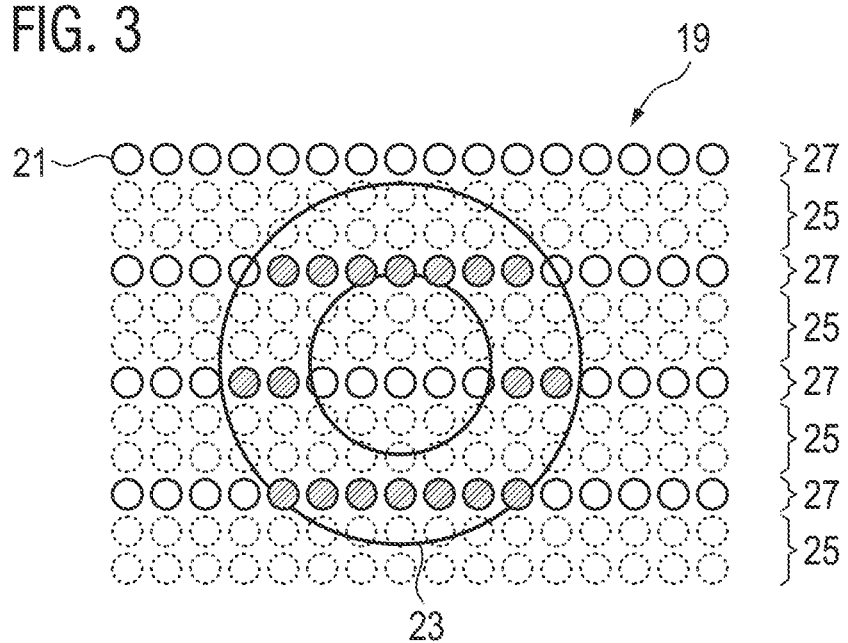
FIGS. 3 to 8 show schematic illustrations of low-resolution images.
Figure 4:
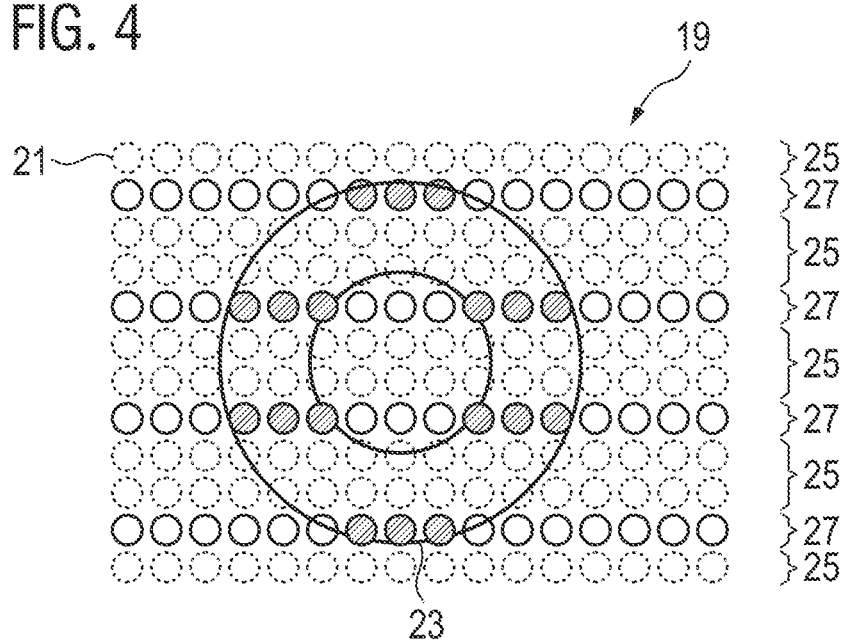
Figure 5:
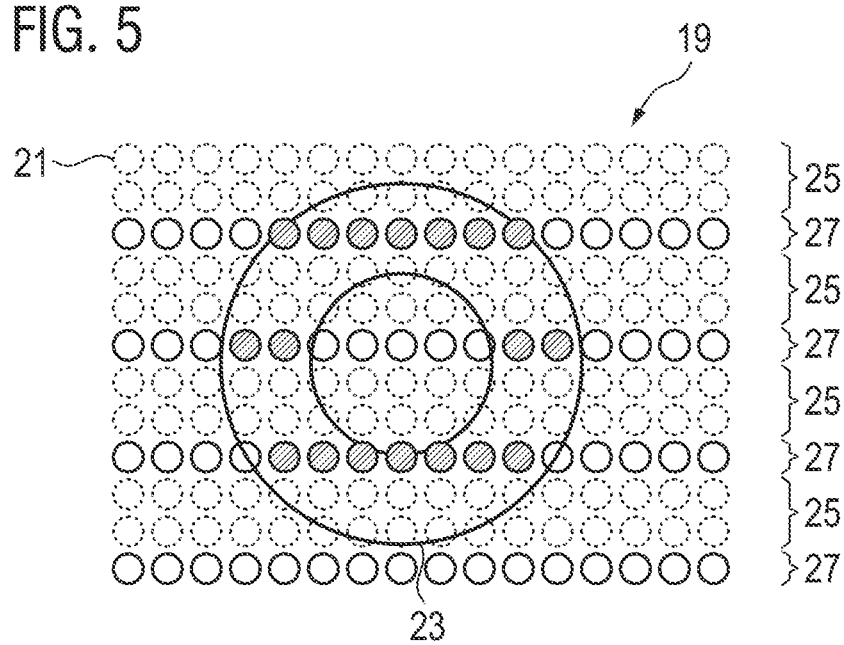

In the present exemplary embodiment, the computer 17 executes a computer program which creates a high-resolution image from the buffered low-resolution images of the video stream. When creating the high-resolution image from the buffered low-resolution frames of the video stream, the present exemplary embodiment exploits the fact that the grid points 21 of the lines 27 used when scanning have a different position relative to the observation object 9, and hence relative to the structure 23, in different frames. By way of example, the different positions can also be brought about by virtue of the fact that different lines 25 in the frames of the video stream are omitted in each case, and so different lines 27 of the grid 19 respectively find use during scanning. This is illustrated schematically in FIGS. 4 and 5. By way of example, the lines 27 in each frame used during scanning can be respectively shifted by one grid position in the y-direction, as illustrated in FIGS. 3 to 5. If n lines are omitted, n+1 images, in which lines 25 used during scanning respectively have a different position relative to the observation object 9 and hence relative to the structure 23, are generated. Therefore, the pixels showing the structure 23 represent different regions of the structure 23 in each low-resolution image.

Since the reduction in the resolution does not emerge from an increase in the dimensions of the grid points 21 but, with unchanging dimensions of the grid points 21, from an increase in the spacings between the grid points 21, in this case between the lines 27 of the grid 19 used during scanning, an image corresponding to the high-resolution image illustrated in FIG. 2 can ideally be generated by the superimposition of the n+1 frames. Since the n+1 frames are all situated in the buffer, the video stream need not be interrupted for the creation of the high-resolution image. Should the buffer not contain enough frames for creating the high-resolution image, use can be made of further, currently recorded frames of the video stream for the purposes of creating the high-resolution image until the number of employed frames is sufficient to create the high-resolution image.

Figure 6:
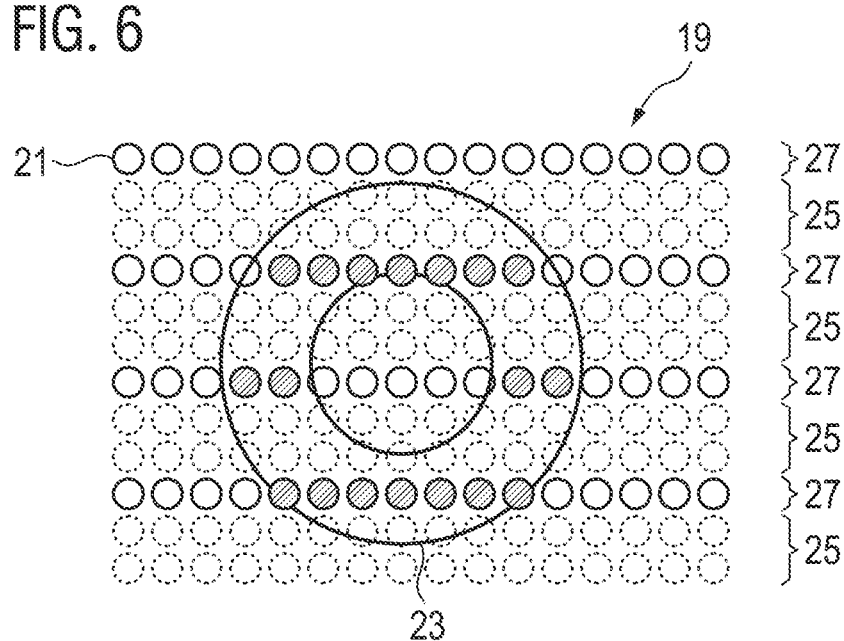
Figure 7:
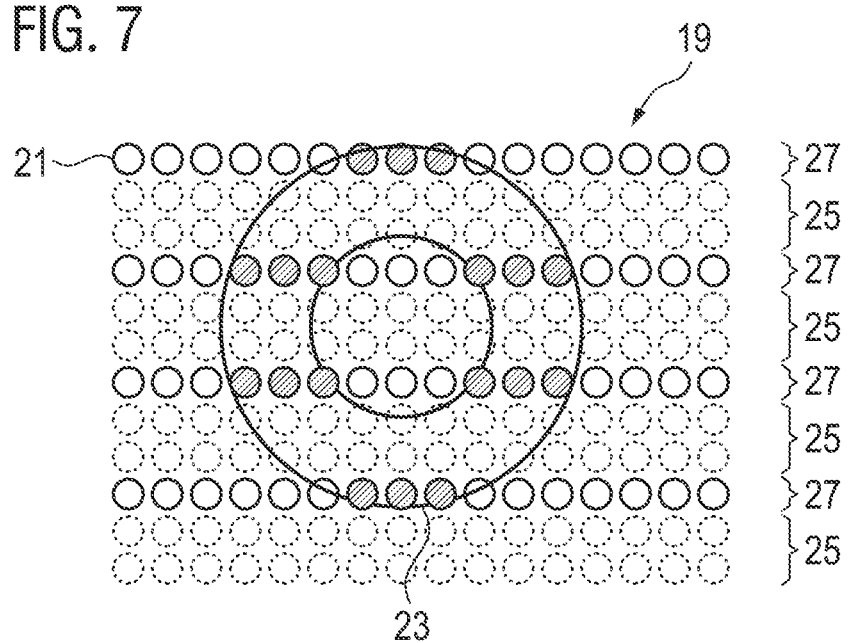
Figure 8:
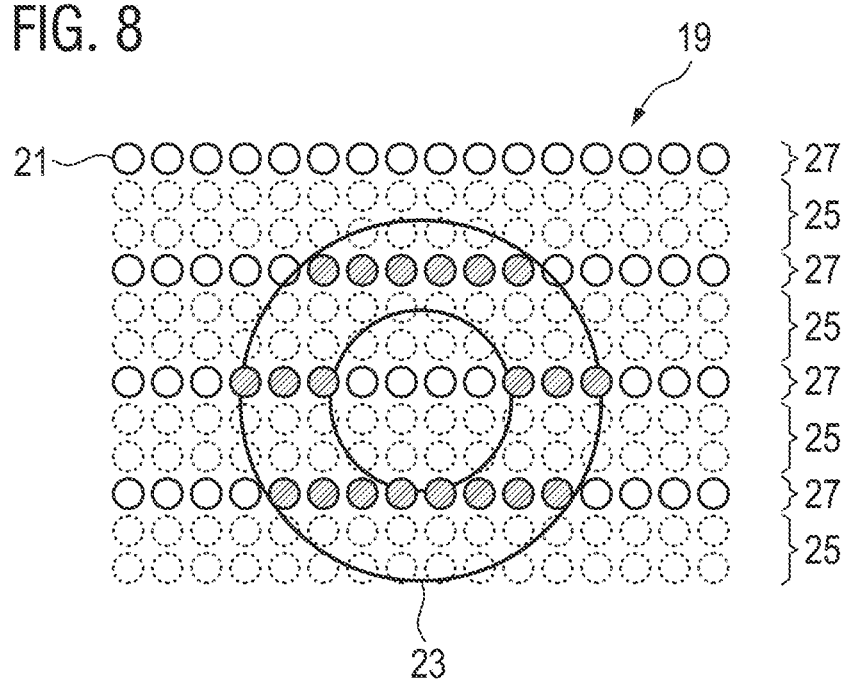

In relation to FIGS. 2 to 5, the assumption was made that the observation object 3 itself is fixed in space, i.e., it does not move. In the reality of endomicroscopic applications this is not the case. Living tissue moves on account of physiological processes, and so it is not stationary in relation to the scanning device 11. As a rule, the movements in relation to the scanning device 11 are of a size such that the same grid lines 27 can be used in all frames when scanning, simplifying the scanning procedure. This situation is illustrated in FIGS. 6 to 8. In the figures, the respectively scanned grid lines 27 and the respectively omitted grid lines 25 are identical in all frames. The different positions of the observation object 9, and hence of the structure 23, relative to the grid points 21 in the respective low-resolution frames results solely from the movement of the observation object 9. Since the motion of the observation object 9 is subject to certain variations, the positions of the observation object 9 or of the structure 23 relative to the grid points 21 of the grid 19 repeat in non-cyclical fashion, as would be the case in the n+1 frames in the case of an object at rest and respectively different lines 27 used during scanning. Therefore, as a rule, the movement of the observation object 9 leads to more than n+1 frames being required in the case of n omitted lines in order to capture all regions of the structure 23 with grid points 21. Therefore, more than n+1 frames are required, as a rule, for creating the high-resolution image when n lines are omitted in the frames.

Since the motion of the observation object 9 or of the structure 23 in relation to the grid 19 leads to changes in the position of the structure 23 in relation to the grid points 21 that are not known in advance, there is a registration of the low-resolution frames with respect to one another in the computer 17 as a first step for creating an image with an increased resolution in relation to the frames. Here, as a rule, one of the low-resolution frames is used as reference image and a respective transformation is ascertained for each further frame, which leads to the structure 23 displayed in the frame being made congruent with the structure 23 displayed in the frame selected as a reference image. Such a transformation can take account of both translations and rotations of the structure 23 in this case. Moreover, the physiological processes can also lead to the structure 23 expanding and contracting. Therefore, the transformations used for registration purposes can also contain changes in the scaling. To improve the quality of the registration, it is useful if, prior to the ascertainment of the transformation for the reference image and the frames to be transformed, intensity values for the grid points 21 of the lines 25 omitted during the scanning are calculated in each case with interpolation from the intensity values of the grid points 21 of the lines 27 used during the scanning so that all pixels can be taken into account during the registration.

After the frames used to create the image with the increased resolution have been registered with respect to one another, there is a superimposition of the registered frames. Since the pixels in the frames representing the structure 23 in each case represent different regions of the structure 23, a high-resolution image can be generated by superimposition of the frames. In particular, it is possible to generate a high-resolution image, as illustrated in FIG. 2. In the case of a correspondingly large number of frames, it is even possible, in principle, to generate an image with a higher resolution than the resolution that would be present when all grid lines are used during scanning. This is based on the fact that grid points of various frames can also show regions of the structure 23 that partly overlap one another in the case of a movement of the imaged object 9. Then, it is possible to ascertain brightness values from the overlap, which have finer gradations than the brightness values in the high-resolution image illustrated in FIG. 2. To this end, the pixels corresponding to the grid points 21 could be mapped to pixels with smaller dimensions. This is explained below with reference to FIG. 9. Within the scope of the superimposition, it is also possible to interpolate between the intensity values of grid points of the low-resolution frames in order to generate intensity values for grid points of the high-resolution image. The accuracy of the interpolation increases with an increasing number of low-resolution frames.

Figure 9:
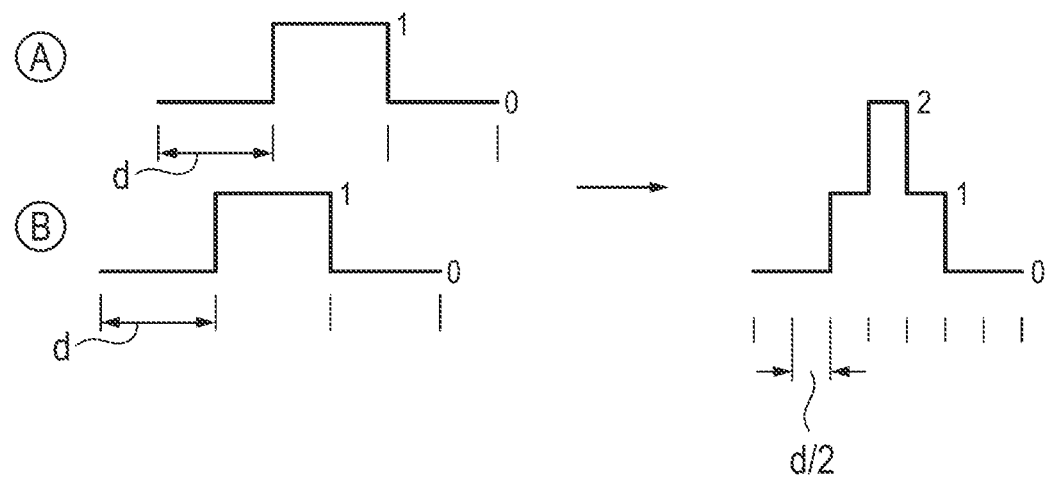
FIG. 9 shows an example for increasing the resolution beyond the resolution of the employed grid.

FIG. 9 shows very schematically brightness distributions of a first frame A and of a second frame B, with the structure 23 for the respective pixel merely being offset by half a dimension d of a pixel. For reasons of simplicity, a pixel can only adopt two values in the present exemplary embodiment, specifically the value 1 for a white pixel and the picture value 0 for a black pixel. In the frames A, B illustrated in FIG. 9, the pixels with the value 1 are shifted in relation to one another by half the pixel dimension. If new pixels are now generated, the dimensions of which correspond to half the dimension of the original pixels, one of three different grayscale values could be respectively assigned to the new pixels, specifically white (value 2), black (value 0) and gray (value 1). In this way, the resolution can also be increased beyond the resolution that can be obtained by the individual grid points 21.

Instead of the superimposition of the registered frames described in the present exemplary embodiment, the high-resolution image can also be created in a different way. By way of example, the pixel values of the high-resolution image can be ascertained from weighted contributions of the low-resolution frames. Here, the weighted contributions need not, in particular, only originate from the pixels in the frame whose position in the low-resolution image corresponds to the position of the pixel in the high-resolution image, the pixel value of which is intended to be ascertained. Rather, the weighted contributions can also be based on pixels adjacent to these pixels. By way of example, an algorithm for ascertaining pixel values of a high-resolution image from weighted contributions of frames is described in B. Wronski et al. "Handheld Multi-Frame Super-Resolution" ACM Trans. Graph., Vol 38, No. 4, Article 28, July 2019. Reference is made to this document in respect of details of the algorithm. However, the algorithm developed by B. Wronski et al. assumes that all sensor pixels of the image sensor have been exposed in the low-resolution frames, i.e., that the frames each form a contiguous area with image information. However, within the scope of the present disclosure, the low resolution of the frames emerges from the omission of grid points of the pixel grid, leading to the low-resolution frames representing areas in which the image information has gaps. In order to be able to optimally apply the algorithm by B. Wronski et al., it is therefore advantageous if the gaps in the image information of the frames are filled by image information that has been interpolated on the basis of the image information contained in the non-omitted grid points. Advantageously, this interpolation is already carried out prior to the registration of the images since this can also improve the result of the registration.

In the present exemplary embodiment, the high-resolution image is created successively from the low-resolution frames, i.e., an image with a higher resolution is initially generated from a relatively small number of low-resolution frames and the resolution of this image with a higher resolution is then increased further by the addition of further low-resolution frames. Here it is possible, in principle, to already make a start with two frames and then increase the resolution further by the addition of further frames. Then, further frames are added until a termination criterion is satisfied.

In the simplest case, the termination criterion can be the reception of a termination signal brought about by the user. To this end, the currently created image with its current resolution can be displayed to the user on a display. If the obtained resolution is sufficient for the user, they can transmit the termination signal, for example by way of a manual input by way of the keyboard, by way of a voice command, by actuating a foot switch, etc. The creation of the high-resolution image is then completed and the present image with its obtained resolution is presented as the high-resolution image. To provide assistance for the user, a value for a quality parameter can also be calculated and displayed on the display in the process. By way of example, the quality parameter can be the dimensions of the smallest structures identifiable with the obtained resolution. As an alternative or in addition thereto, a numerical value can also be used as a quality parameter, said numerical value specifying the ratio of the obtained resolution to the resolution of a frame recorded when the entire grid is used. As a further alternative, the quality parameter can specify the percentage by which the resolution in the high-resolution image has been increased by a number of most recently added low-resolution images. Here, in particular, the change can be displayed in the form of a curve, in which a significant change is indicated by a steep profile of the curve and a small change is indicated by a flat profile of the curve.

Instead of triggering the termination criterion, the user alternatively or additionally also has the option of letting the presence of a termination criterion be ascertained in automated fashion by the computer 17 on the basis of the value of one of the quality parameters. By way of example, it is possible to specify a resolution which, when obtained, terminates the creation of the high-resolution image. Alternatively, following each addition of a frame or a plurality of frames, it is possible to check the extent to which the resolution has improved by the addition of the frame or frames. If a significant improvement in the resolution is no longer ascertained, then this can serve as a termination criterion for terminating the creation of the high-resolution image. If the change in the position of the observation object 9 relative to the grid 19 is brought about purely by modifying the lines 27 used during scanning, as has been described in relation to FIGS. 3 to 5, it is also a possibility to use the use of all n+1 low-resolution frames as a termination criterion.

While the high-resolution image is created, the recording of the low-resolution frames and hence the recording and the display of the video stream can be continued in parallel.

The present disclosure has been described in detail on the basis of exemplary embodiments for purposes of explanation. However, a person skilled in the art will appreciate that it is possible to depart from the exemplary embodiments within the scope of the disclosure. By way of example, rather than omitting lines when scanning, the reduction in the resolution can also be achieved by virtue of scanning each line but not all grid points of the lines. It is likewise possible to combine the omission of lines with the omission of grid points for the purposes of reducing the resolution. What this can achieve is that the reduction in the resolution is not concentrated in one direction. Thus, the reduction of the resolution in the y-direction can be less without reducing the frame rate in the process if there is also a reduction of the resolution in the x-direction. Thus, the resolution of the frames can be reduced in a manner symmetric in the x-direction and y-direction by way of a type of checkerboard pattern. Additionally, the grid need not be constructed of lines and columns like in the exemplary embodiments. By way of example, grids constructed in ring-shaped fashion, grids constructed in spiral fashion or even irregular grids are also conceivable. Therefore, the scope of protection of the present disclosure is not intended to be limited by the exemplary embodiments but rather only by the appended claims.

LIST OF REFERENCE NUMERALS

1 Endomicroscope
3 Optical fiber
5 First end
7 Second end
9 Observation object
11 Scanning device
13 Sensor
15 Housing
17 Computer
19 Grid
21 Grid point
23 Structure
25 Omitted lines
27 Scanned lines

What is claimed is:

1. A computer-implemented method for creating a high-resolution image of an on object from a plurality of low-resolution images of the object, both the low- resolution images and the high-resolution image being composed of a pixel grid having grid points, and pitches of the grid points of the pixel grid of the low-resolution images being increased in at least one image dimension in comparison with the pitches of the grid points of the pixel grid of the high-resolution image, the method comprising:

continuously buffering frames of a video stream as the low-resolution images in a memory in which the frames of the video stream are stored for a certain storage time, overwriting the frames of the video stream in the memory for which the storage time has elapsed with current frames of the video stream, and creating the high-resolution image following a trigger event, wherein upon the trigger event, currently buffered frames of the video stream are used as the low-resolution images for creating the high-resolution image, where creating the high-resolution image includes:

registering the currently buffered frames of the video stream with respect to one another to obtain a plurality of registered images; and superimposing the plurality of registered images on one another to obtain the high- resolution image, wherein the grid points of the pixel grid of the plurality of low-resolution images and the grid points of the pixel grid of the high-resolution image have same dimensions, and wherein high-resolution images are created with image information obtained from different positions of the object relative to the grid points in individual frames of the video stream.

2. The computer-implemented method according to claim 1, further comprising:
continually adding further low-resolution images to create the high-resolution image, in addition to the low-resolution images already used to create the high-resolution image.

3. The computer-implemented method according to claim 2, wherein a number of low-resolution images are received following a trigger event and are used in addition to buffered low-resolution images to create the high-resolution image.

4. The computer-implemented method according claim 1, further comprising:
beginning with two low-resolution images to create the high-resolution image; and
subsequently adding further low-resolution images.

5. The computer-implemented method according to claim 1, further comprising:
adding further low-resolution images to create the high-resolution image until a termination criterion for the adding of the further low-resolution images has been satisfied.

6. The computer-implemented method according to claim 3, further comprising:
visualizing intermediate results when using further low-resolution images to create the high-resolution image.

7. The computer-implemented method according to claim 1, further comprising:
complementing missing image information in the low-resolution images before or after registration of the low-resolution images, wherein the missing image information is obtained based on an interpolation from available image information.

8. The computer-implemented method according to claim 1, further comprising:
determining a value for a quality parameter for the high-resolution image.

9. A method for creating a high-resolution image of an object from a plurality of low-resolution images of the object, both the low-resolution images and the high-resolution image being composed of a pixel grid having grid points, the method comprising:
successively recording frames of a video stream as the plurality of low-resolution images of the object with an image recording device, wherein pitches of the grid points of the pixel grid are increased in at least one image dimension in comparison with the pitches of the grid points of the pixel grid in the high-resolution image to be created,
continuously buffering frames of a video stream as the low-resolution images in a memory in which the frames of the video stream are stored for a certain storage time,
overwriting the frames of the video stream in the memory for which the storage time has elapsed with current frames of the video stream, and
creating the high-resolution image following a trigger event, wherein upon the trigger event, currently buffered frames of the video stream are used as the low-resolution images for creating the high-resolution image, where creating the high-resolution image includes:
registering the buffered frames of the video stream with respect to one another with a data processing system to obtain a plurality of registered images and to superimpose the plurality of registered images to obtain the high-resolution image,
wherein the grid points of the pixel grid of the plurality of low-resolution images and the grid points of the pixel grid of the high-resolution image have same dimensions, and
wherein high-resolution images are created by the data processing system with image information obtained by the data processing system from different positions of the object relative to the grid points in the individual frames of the video stream.

10. The method according to claim 9, further comprising:
increasing the pitches of the grid points of the pixel grid when recording the plurality of low-resolution images in comparison with the pitches of the grid points of the pixel grid of the high-resolution image by virtue of lines of the pixel grid not being used when recording the plurality of low-resolution images.

11. The method according to claim 9, wherein the different positions of the object relative to the grid points in the recorded individual low-resolution images result from a movement of the object in a case of a spatially fixed pixel grid.

12. The method according to claim 9, wherein the different positions of the object relative to the grid points in the recorded individual low-resolution images result from a displacement of the pixel grid.

13. The method according to claim 9, further comprising:
continuously recording the plurality of low-resolution images; and
buffering most recently recorded low-resolution images, wherein the high-resolution image is created with buffered low-resolution images.

14. The method according to claim 9, further comprising:
creating the high-resolution image following a trigger event.

15. The method according to claim 9, further comprising:
scanning the object along a grid corresponding to the pixel grid with an optical fiber to record the plurality of low-resolution images.

16. A computer program for creating a high-resolution image from a plurality of low-resolution images, both the low-resolution images and the high-resolution image being composed of a pixel grid having grid points and pitches of the grid points of the pixel grid of the low-resolution images being increased in at least one image dimension in comparison with the pitches of the grid points of the pixel grid of the high-resolution image, the computer program comprising instructions which, when executed on a computer, cause the computer to:
continuously buffer frames of a video stream as the low-resolution images in a memory in which the frames of the video stream are stored for a certain storage time,
overwrite the frames of the video stream in the memory for which the storage time has elapsed with current frames of the video stream, and
create the high-resolution image following a trigger event, wherein upon the trigger event, the currently buffered frames of the video stream are used as the low-resolution images for creating the high-resolution image, wherein the computer program further includes instructions which, when executed on the computer, cause the computer to create the high-resolution image by:
registering the buffered frames of the video stream with respect to one another to obtain a plurality of registered images; and
superimposing the plurality of registered images on one another to obtain the high-resolution image, wherein the grid points of the pixel grid of the plurality of low-resolution images and the grid points of the pixel grid of the high-resolution image have same dimensions, and wherein the instructions cause the computer to create high-resolution images with image information obtained from different positions of an object relative to the grid points in the individual frames of the video stream.

17. A non-volatile computer-readable storage medium with instructions stored thereon for creating a high-resolution image from a plurality of low-resolution images, both the low-resolution images and the high-resolution image being composed of a pixel grid having grid points, and pitches of the grid points of the pixel grid of the low-resolution images being increased in at least one image dimension in comparison with the pitches of the grid points of the pixel grid of the high-resolution image, and the instructions, when executed on a computer, causing the computer to:

continuously buffer frames of a video stream as the low-resolution images in a memory in which the frames of the video stream are stored for a certain storage time, overwrite the frames of the video stream in the memory for which the storage time has elapsed with current frames of the video stream, and create the high-resolution image following a trigger event, wherein upon the trigger event, the currently buffered frames of the video stream are used as the low-resolution images for creating the high-resolution image, wherein the instructions, when executed on the computer, cause the computer to create the high-resolution image by:

registering the buffered frames of the video stream with respect to one another to obtain a plurality of registered images; and superimposing the plurality of registered images on one another to obtain the high-resolution image, wherein the grid points of the pixel grid of the plurality of low-resolution images and the grid points of the pixel grid of the high-resolution image have same dimensions, and wherein high-resolution images are created with image information obtained from different positions of an object relative to the grid points in the individual frames of the video stream.

18. A data processing system comprising:
a processor;
at least one memory encoded with a computer program comprising instructions for creating a high-resolution image from a plurality of low-resolution images stored in the at least one memory, both the low-resolution images and the high-resolution image being composed of a pixel grid having grid points and pitches of the grid points of the pixel grid of the low-resolution images being increased in at least one image dimension in comparison with the pitches of the grid points of the pixel grid of the high-resolution image; and
the processor being configured, by the instructions, to:
continuously buffer frames of a video stream as the low-resolution images in a memory in which the frames of the video stream are stored for a certain storage time, overwrite the frames of the video stream in the memory for which the storage time has elapsed with current frames of the video stream, and create the high-resolution image following a trigger event, wherein upon the trigger event, the currently buffered frames of the video stream are used as the low-resolution images for creating the high-resolution image, wherein the instructions, when executed on a computer, cause the computer to create the high-resolution image by:

registering the buffered frames of the video stream with respect to one another to obtain a plurality of registered images; and superimposing the plurality of registered images on one another to obtain the high-resolution image, wherein the grid points of the pixel grid of the plurality of low-resolution images and the grid points of the pixel grid of the high-resolution image have same dimensions, and wherein high-resolution images are created with image information obtained from different positions of an object relative to the grid points in the individual frames of the video stream.

19. The data processing system according to claim 18, further comprising:
a buffer for buffering the low-resolution images.

20. An optical observation apparatus comprising:
an image recording device configured to record images of the object, said images being composed of the pixel grid; and
the data processing system according to claim 19.

21. The optical observation apparatus according to claim 20, further comprising:
a device for altering the pitches between the grid points of the pixel grid.

22. The optical observation apparatus according to claim 21, wherein the image recording device comprises:
a sensor configured to capture luminous energy;
an optical fiber configured to receive light originating from the object and to guide the received light to the sensor;
a scanning device configured to facilitate a scanning of the object along the grid points of a grid for receiving the light which originates from individual grid points; and
an image generation device which generates an image of the object with the pixel grid corresponding to the grid when scanning with the optical fiber from the luminous energy captured by the sensor for the individual grid points.

23. The optical observation apparatus according to claim 22, wherein the device for altering the pitches between the grid points of the grid acts on the scanning device to alter the pitches between the grid points used when scanning.

24. The optical observation apparatus according to claim 23, wherein the scanning device is configured to scan the object line-by-line and the device for altering the pitches between the grid points of the grid acts on the scanning device such that lines of the grid are omitted during the scan to increase the pitches between the grid points used when scanning.

* * * * *